US008412786B2

(12) United States Patent
Reeves et al.

(10) Patent No.: US 8,412,786 B2
(45) Date of Patent: Apr. 2, 2013

(54) DECOMPOSITION AND DELIVERY OF MESSAGE OBJECTS BASED ON USER INSTRUCTIONS

(75) Inventors: Raymond Emilio Reeves, Olathe, KS (US); Ryan Alan Wick, Apollo Beach, FL (US); Thomas Michael Hughson, Boscawen, NH (US)

(73) Assignee: Sprint Communications Company L.P., Overland Park, KS (US)

( * ) Notice: Subject to any disclaimer, the term of this patent is extended or adjusted under 35 U.S.C. 154(b) by 262 days.

(21) Appl. No.: 12/763,845

(22) Filed: Apr. 20, 2010

(65) Prior Publication Data

US 2011/0258265 A1 Oct. 20, 2011

(51) Int. Cl.
*G06F 15/16* (2006.01)
*H04W 4/00* (2009.01)

(52) U.S. Cl. ........................................ 709/206; 455/466

(58) Field of Classification Search .......... 709/204–207, 709/238–240; 455/412.1–412.2, 413–414.4, 455/466
See application file for complete search history.

(56) References Cited

U.S. PATENT DOCUMENTS

| 5,646,982 | A |  | 7/1997 | Hogan et al. |
| 5,680,551 | A |  | 10/1997 | Martino, II |
| 5,712,901 | A | * | 1/1998 | Meermans ................. 379/88.14 |
| 5,983,265 | A |  | 11/1999 | Martino, II |
| 6,421,707 | B1 | * | 7/2002 | Miller et al. .................. 709/206 |
| 6,424,426 | B1 |  | 7/2002 | Henry |
| 6,463,462 | B1 |  | 10/2002 | Smith et al. |
| 6,574,670 | B1 | * | 6/2003 | Eguchi .......................... 709/245 |
| 6,597,918 | B1 | * | 7/2003 | Kim ............................... 455/466 |
| 6,728,548 | B1 |  | 4/2004 | Willhoff |
| 7,009,725 | B2 | * | 3/2006 | Miyanaga ..................... 358/1.15 |
| 7,016,543 | B2 | * | 3/2006 | Castagno et al. ............. 382/233 |
| 7,346,659 | B2 | * | 3/2008 | Matsuura et al. ............. 709/206 |
| 2001/0032240 | A1 | * | 10/2001 | Malone et al. ................ 709/203 |
| 2002/0044294 | A1 | * | 4/2002 | Matsuura et al. ............. 358/1.13 |
| 2002/0052922 | A1 | * | 5/2002 | Matsuura et al. ............. 709/206 |
| 2003/0096600 | A1 |  | 5/2003 | Lewis et al. |
| 2003/0126216 | A1 | * | 7/2003 | Avila et al. .................... 709/206 |
| 2003/0135569 | A1 | * | 7/2003 | Khakoo et al. ................ 709/206 |
| 2003/0154254 | A1 |  | 8/2003 | Awasthi |
| 2004/0008373 | A1 | * | 1/2004 | Yamamoto .................... 358/1.15 |
| 2004/0201625 | A1 |  | 10/2004 | Karamchedu et al. |
| 2005/0114514 | A1 | * | 5/2005 | Bostrom et al. .............. 709/227 |
| 2005/0148351 | A1 | * | 7/2005 | Reding et al. ................ 455/466 |
| 2005/0191994 | A1 | * | 9/2005 | May et al. .................. 455/412.2 |
| 2005/0266863 | A1 | * | 12/2005 | Benco et al. .................. 455/466 |
| 2006/0136371 | A1 | * | 6/2006 | Yuan et al. ........................ 707/2 |

(Continued)

FOREIGN PATENT DOCUMENTS

GB 2402020 A * 11/2004

OTHER PUBLICATIONS

IBMTDB2—"Privacy Notes in Email Documents", IP.com No. IPCOM000134776D, (Mar. 20, 2006).*

*Primary Examiner* — Brendan Higa

(57) ABSTRACT

A message system comprises a communication interface and a processing system. The communication interface is configured to receive a message object addressed to a user. The processing system is configured to store a copy of the message object, process the message object based on user decomposition instructions to generate a decomposed message object, select a delivery mechanism for the decomposed message object based on user delivery instructions, and direct the communication interface to transfer the decomposed message object for delivery to the user according to the delivery mechanism. The communication interface configured to transfer the decomposed message object for delivery to the user according to the delivery mechanism.

16 Claims, 6 Drawing Sheets

U.S. PATENT DOCUMENTS

| | | |
|---|---|---|
| 2007/0277238 A1 | 11/2007 | Margalit et al. |
| 2007/0280214 A1* | 12/2007 | Dowens et al. ............... 370/356 |
| 2007/0293195 A1 | 12/2007 | Angwin et al. |
| 2008/0090553 A1* | 4/2008 | Wan et al. .................... 455/413 |
| 2008/0126493 A1 | 5/2008 | Morrey |
| 2008/0130630 A1 | 6/2008 | Shim et al. |
| 2009/0005011 A1* | 1/2009 | Christie et al. ............. 455/412.2 |
| 2009/0006651 A1* | 1/2009 | Kim ............................... 709/246 |
| 2009/0157834 A1 | 6/2009 | Krishnaswamy |
| 2011/0300833 A1* | 12/2011 | Shaw ............................ 455/413 |

* cited by examiner

DECOMPOSITION AND DELIVERY OF MESSAGE OBJECTS BASED ON USER INSTRUCTIONS

TECHNICAL BACKGROUND

Individuals and businesses are becoming increasingly reliant on communication networks to send and receive information. For example, individuals may utilize communication networks for voice communications, research, and entertainment, and organizations typically require the use of high speed data networks such as the Internet for conducting critical business transactions.

Several methods of communication over communication networks are possible. For example, users may communicate via traditional voice calls, email, short message service (SMS) text messages, multimedia message service (MMS) messages, instant messaging (IM), push-to-talk (PTT), and various other communication techniques. Under traditional delivery methods, messages in a technology-specific service are typically transferred between respective nodes that are specific to that message service. For example, a sender transfers an email message to an email node serving the sender's email account, which in turn transfers the email message for delivery to another email node serving the recipient's email account. In this manner, the recipient receives the email message transferred from the sender in his or her inbox, which is typically a client application that downloads the email message from the email node serving the recipient's email account. Other communication services typically transfer messages in a similar manner, but operate as separate and distinct services that utilize different technology-specific service nodes.

OVERVIEW

A message system comprises a communication interface and a processing system. The communication interface is configured to receive a message object addressed to a user. The processing system is configured to store a copy of the message object, process the message object based on user decomposition instructions to generate a decomposed message object, select a delivery mechanism for the decomposed message object based on user delivery instructions, and direct the communication interface to transfer the decomposed message object for delivery to the user according to the delivery mechanism. The communication interface configured to transfer the decomposed message object for delivery to the user according to the delivery mechanism.

A method of operating a message system comprises receiving a message object addressed to a user, storing a copy of the message object, processing the message object based on user decomposition instructions to generate a decomposed message object, selecting a delivery mechanism for the decomposed message object based on user delivery instructions, and transferring the decomposed message object for delivery to the user according to the delivery mechanism.

A message system comprises a communication interface and a processing system. The communication interface is configured to receive a message object addressed to a user. The processing system is configured to store a copy of the message object, process the message object based on user decomposition instructions to generate a decomposed message object, wherein the user decomposition instructions comprise an instruction to process the message object based on a message type of the message object and wherein the decomposed message object comprises a link to the copy of the message object, select a delivery mechanism for the decomposed message object based on user delivery instructions, wherein the delivery mechanism comprises a message service for the decomposed message object, and direct the communication interface to transfer the decomposed message object for delivery to the user according to the delivery mechanism. The communication interface is configured to transfer the decomposed message object for delivery to the user according to the delivery mechanism.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
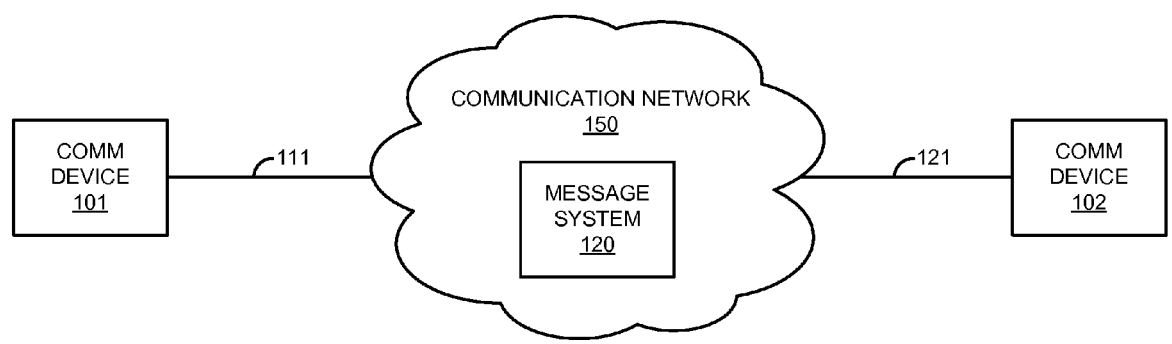
FIG. 1 is a block diagram that illustrates a communication system.

FIG. 1 is a block diagram that illustrates communication system 100. Communication system 100 includes communication device 101, communication device 102, and communication network 150. Communication network 150 includes message system 120. Communication device 101 communicates with communication network 150 over communication link 111. Likewise, communication device 102 communicates with communication network 150 over communication link 121.

Figure 2:
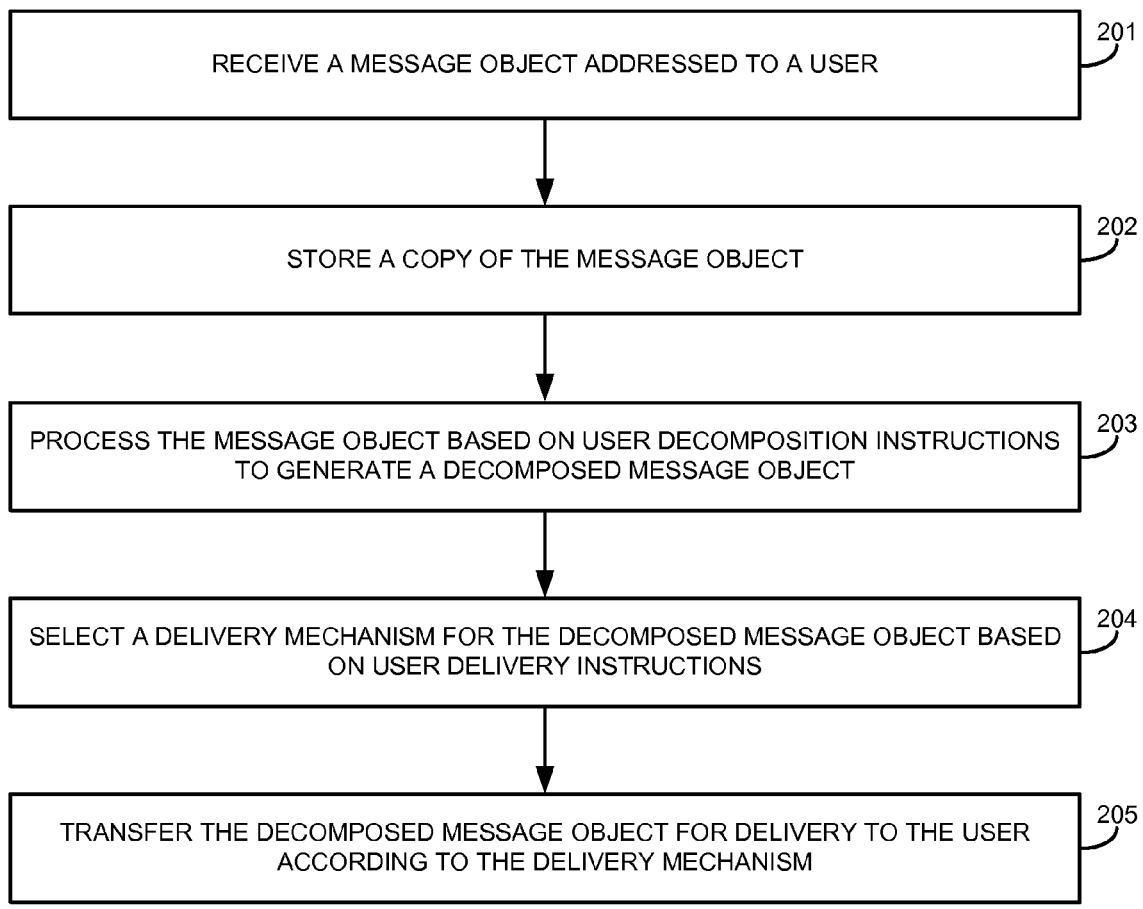
FIG. 2 is a flow diagram that illustrates an operation of the communication system.

FIG. 2 is a flow diagram that illustrates an operation of communication system 100. The steps of the operation are indicated below parenthetically. In FIG. 2, message system 120 receives a message object addressed to a user (201). The message object could comprise any message intended for delivery to the user. For example, the message object could comprise an email message, short message service (SMS) message, multimedia message service (MMS) message, voicemail message, hyper text transfer protocol (HTTP) message, instant messaging (IM) message, or any other type of message—including combinations thereof. For the purpose of illustration, this example assumes that a user of communication device 101 has transferred a message object for delivery to a user of communication device 102.

Message system 120 stores a copy of the message object (202). For example, message system 120 may comprise a memory device in which system 120 stores the copy of the message object. In other examples, message system 120 may be in communication with a database or some other storage system that provides non-volatile storage for the message object.

Message system 120 then processes the message object based on user decomposition instructions to generate a decomposed message object (203). The user of communication device 102 could provide the user decomposition instructions to message system 120 to specify the manner in which the user wants message system 120 to process message objects. For example, the user decomposition instructions could comprise various rules to direct message system 120 to process message objects in different ways. In some examples, the user decomposition instructions could direct message system 120 to generate the decomposed message object in a message type specified in the user decomposition instructions, which could be based on the type of message object received by system 120. For example, the user may request to receive an SMS message of every email message addressed to the user that is received by message system 120. In other examples, the user may require message system 120 to always generate the decomposed message object in a default message type, such as email.

The user decomposition instructions could also determine the content of the decomposed message object. In some examples, the user decomposition instructions could direct message system 120 to generate a decomposed message object comprising a first portion of a beginning of the message object and a second portion of an end of the message object. For example, the user may specify that if an email message is greater than 20 words, system 120 should generate a decomposed message object comprising an SMS message with only the first and last 10 words of the email message. The user decomposition instructions could also direct message system 120 to generate the decomposed message object based on the content of the message object. For example, if message system 120 determines that the message object comprises video, the user decomposition instructions could direct system 120 to generate a decomposed message object comprising thumbnail still shots of every 10 seconds of the video, rather than providing the entire video. Message system 120 could also segment or fragment a message into a number of parts. For example, message system 120 could fragment a video into 30 second segments, and the decomposed message object could comprise thumbnail stills of every 30 seconds of the video, and each thumbnail could link to the corresponding 30 second video segment. In other examples, the user decomposition instructions could direct message system 120 to generate a decomposed message object comprising a link to the copy of the message object, or message system 120 could be configured to always provide the link to the copy of message object in the decomposed message object.

In still other examples, the user decomposition instructions could direct message system 120 to generate the decomposed message object based on device capabilities or network constraints. For example, if the message object comprises a video MMS message, but the user's communication device 102 lacks the ability to receive MMS messages, the user decomposition instructions may direct message system 120 to generate an email message with a link to the video based on the device capabilities of the user. In other examples, message system 120 may monitor an available bandwidth of communication network 150, and may generate the decomposed message object in a message type appropriate for the available network bandwidth or some other network constraints.

Referring again to FIG. 2, message system 120 selects a delivery mechanism for the decomposed message object based on user delivery instructions (204). In some examples, if the user decomposition instructions specify a particular message type for the decomposed message object, that message type will also dictate the delivery mechanism for the decomposed message object. For example, the user delivery instructions may direct message system 120 to select a message service associated with the message type for the decomposed message object. However, in other examples, the user may not specify a message type in the user decomposition instructions, and instead provide a message service for the decomposed message object in the user delivery instructions. For example, the user decomposition instructions could direct message system 120 to convert all voicemail messages to text, and the user delivery instructions could direct message system 120 to select an email delivery mechanism for the converted voicemail messages, or to select both email and SMS delivery mechanisms.

Once the delivery mechanism is selected, message system 120 transfers the decomposed message object for delivery to the user according to the delivery mechanism (205). For example, if the selected delivery mechanism is email, message system 120 transfers the decomposed message object for delivery to the user's email account according to the delivery mechanism. In some examples, message system 120 is configured to transfer the decomposed message object for delivery to a message service associated with the message type of the decomposed message object. In other examples, message system 120 is configured to transfer the decomposed message object for delivery to a destination specified in the user delivery instructions.

Advantageously, by providing decomposition and delivery instructions to message system 120, the user is able to control both the content of decomposed message objects and the mechanism by which they are delivered. In this manner, the user is afforded the ability to fully customize all aspects of processing and delivery of message objects received by message system 120 that are addressed to the user. Note that the above examples are merely illustrative in nature and are not intended to define the scope of the user instructions or configuration capabilities of message system 120. Rather, the user decomposition instructions and user delivery instructions are intended to encompass innumerable variations and combinations of directions for message system 120 to process and deliver decomposed message objects to a user in a fully customizable manner.

Referring back to FIG. 1, communication devices 101 and 102 comprise hardware and circuitry programmed to function as telecommunications devices. Communication devices 101 and 102 may comprise a communication interface, user interface, memory device, software, processing circuitry, or some other communication components. For example, communication devices 101 and 102 could comprise a telephone, wireless transceiver, mobile phone, cellular phone, smartphone, computer, personal digital assistant (PDA), e-book, game console, mobile Internet device, network interface card, media player, or some communication apparatus—including combinations thereof.

In some examples, communication devices 101 and 102 could comprise wireless communication devices comprising Radio Frequency (RF) communication circuitry and an antenna. The RF communication circuitry typically includes an amplifier, filter, modulator, and signal processing circuitry. Wireless network protocols that may be utilized by communication devices 101 and 102 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Bluetooth Internet, telephony, or some other network protocol—including combinations thereof.

Communication network 150 comprises multiple network elements such as routers, gateways, telecommunication switches, servers, processing systems, or other communication equipment and systems for providing communication and data services. Communication network 150 could comprise wireless communication nodes, telephony switches, Internet routers, network gateways, computer systems, communication links, or some other type of communication equipment—including combinations thereof. Communication network 150 may also comprise optical networks, asynchronous transfer mode (ATM) networks, packet networks, local area networks (LAN), metropolitan area networks (MAN), wide area networks (WAN), or other network topologies, equipment, or systems—including combinations thereof. Communication network 150 may be configured to communicate over metallic, wireless, or optical links. Communication network 150 may be configured to use time-division multiplexing (TDM), Internet Protocol (IP), Ethernet, optical networking, wireless protocols, communication signaling, or some other communication format—including combinations thereof. In some examples, communication network 150 includes further access nodes and associated equipment for providing communication services to many wireless communication devices across a large geographic region.

Message system 120 comprises a computer system and communication interface. Message system 120 may also include other components such as a router, server, data storage system, and power supply. Message system 120 may reside in a single device or may be distributed across multiple devices. Message system 120 may be a discrete system or may be integrated within other systems—including other systems within communication system 100. Message system 120 could comprise a packet gateway, mobile switching center, network gateway system, Internet access node, application server, service node, firewall, or some other communication system—including combinations thereof.

Communication links 111 and 121 use metal, air, space, optical fiber such as glass or plastic, or some other material as the transport media—including combinations thereof. Communication links 111 and 121 could use various communication protocols, such as TDM, IP, Ethernet, telephony, optical networking, hybrid fiber coax (HFC), communication signaling, wireless protocols, or some other communication format—including combinations thereof. Communication links 111 and 121 could be direct links or may include intermediate networks, systems, or devices.

Figure 3:
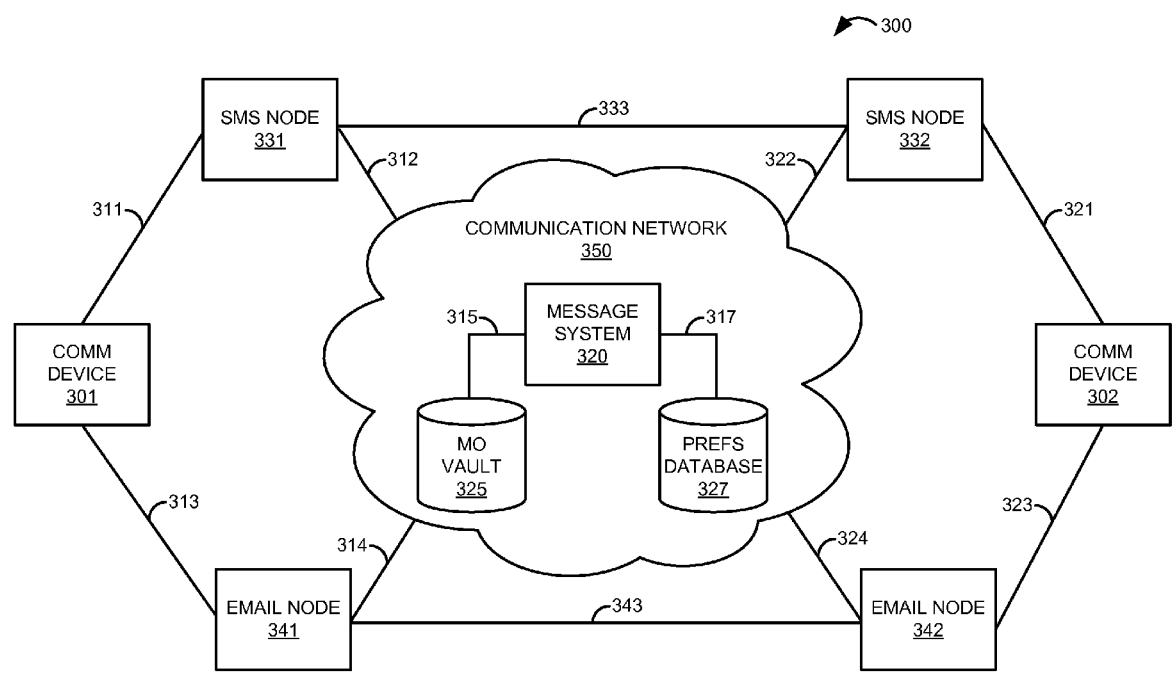
FIG. 3 is a block diagram that illustrates a communication system in an exemplary embodiment.

FIG. 3 is a block diagram that illustrates communication system 300 in an exemplary embodiment. Communication system 300 includes communication devices 301 and 302, SMS nodes 331 and 332, email nodes 341 and 342, and communication network 350. Communication network 350 includes message system 320, message object (MO) vault 325, and preferences database 327. Communication device 301 communicates with SMS node 331 over communication link 311 and email node 341 over communication link 313. Likewise, communication device 302 communicates with SMS node 332 over communication link 321 and email node 342 over communication link 323. SMS nodes 331 and 332 are in communication with message system 320 and communication network 350 via communication links 312 and 322, respectively. SMS nodes 331 and 332 are also in direct communication over communication link 333. Similarly, email nodes 341 and 342 are in communication with message system 320 and communication network 350 via communication links 314 and 324, respectively. Email nodes 341 and 342 are also in direct communication over communication link 343. Message system 320 is in communication with message object vault 325 and preferences database 327 over respective communication links 315 and 317.

Figure 4:
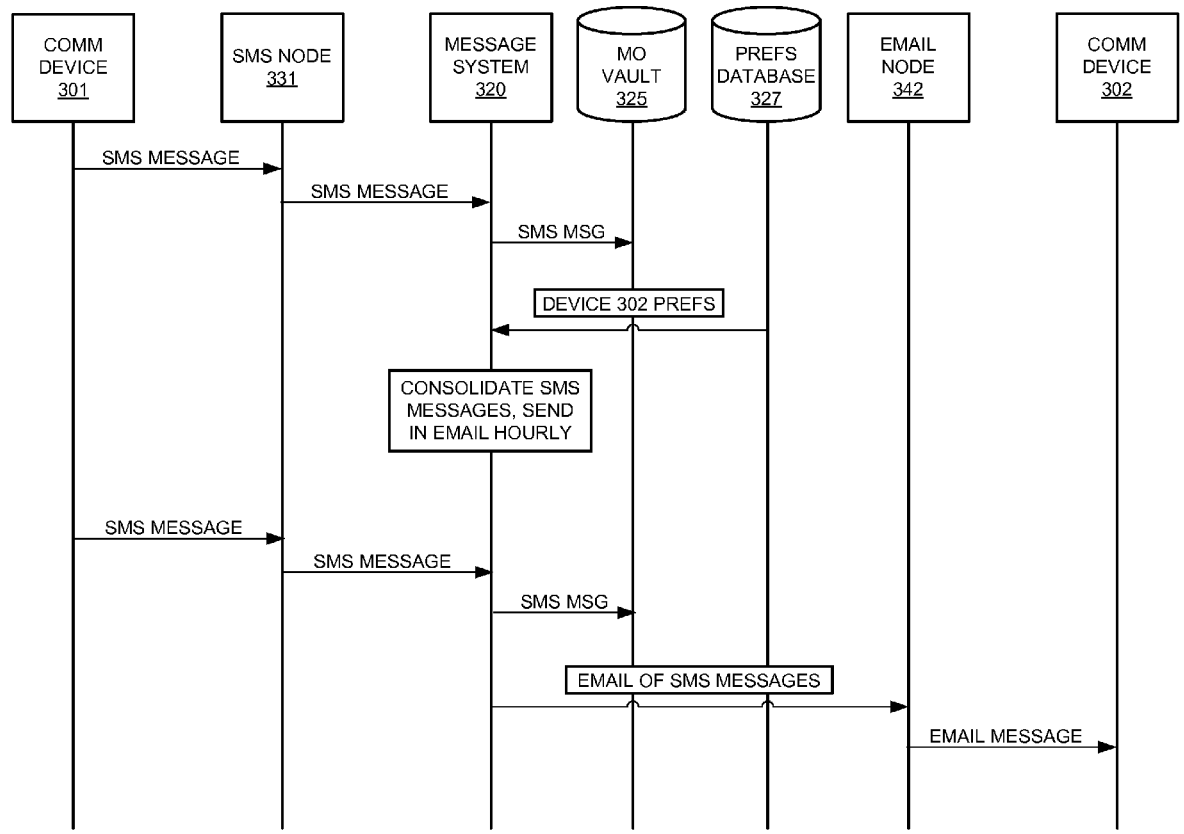
FIG. 4 is a sequence diagram that illustrates an operation of the communication system in an exemplary embodiment.

FIG. 4 is a sequence diagram that illustrates an operation of communication system 300 in an exemplary embodiment. The sequence diagram of FIG. 4 provides just one example of how message system 320 could be configured to process message objects addressed to a user of communication device 302. In FIG. 4, a user of communication device 301 transfers an SMS message for delivery to a user of communication device 302. Thus, communication device 301 transfers the SMS message to SMS node 331. However, rather than transferring the SMS message to SMS node 332 for delivery to communication device 302, as would typically be the case, SMS node 331 is configured to transfer the SMS message to message system 320 instead. This could occur, for example, by a message system agent executing on SMS node 331 which detects the presence of message system 320. In other examples, SMS node 331 may process the destination address of the SMS message to determine whether the user associated with the destination address is subscribed to or other otherwise associated with message system 320.

Regardless of the manner in which SMS node 331 determines to transfer the SMS message to message system 320, system 320 ultimately receives the SMS message from SMS node 331. Message system 320 stores a copy of the SMS message in the message object vault 325. The copy of the SMS message is stored to ensure that the full contents of the original message are preserved prior to any processing performed by message system 320.

Message system 320 then retrieves preferences associated with a user of communication device 302 from preferences database 327. In some examples, message system 320 may process the SMS message to determine that the message is addressed to the user of communication device 302, and provide the user's telephone number or other user identifier to preferences database 327. Preferences database 327 then matches the user identifier with the preferences previously supplied by the user of device 302, and transfers these preferences to message system 320.

Message system 320 processes the user's preferences to determine the user's decomposition instructions and delivery instructions for SMS messages. In this example, the user has requested message system 320 to consolidate all SMS messages addressed to the user and send them to the user in an hourly email digest. Thus, message system 320 inserts the content of the SMS message into an email addressed to the user, starts a timer for one hour, and waits for additional SMS messages addressed to the user.

At a later point in time, communication device 301 transfers a second SMS message for delivery to the user of communication device 302. SMS node 331 receives the SMS message from communication device 301 and forwards it to message system 320. Message system 320 stores a copy of the second SMS message in the message object vault 325 to preserve the original SMS message.

Message system 320 has already retrieved the user's decomposition and delivery instructions from preferences database 327 and is configured to add the second SMS message to the email and continue to wait for the hour-long timer to complete based on the user's instructions. After one hour has elapsed, message system 320 transfers the contents of the SMS messages consolidated in the email message for delivery to the user of communication device 302. Thus, message system 320 transfers the email message to email node 342 which provides service for the user's email account. Communication device 302 then receives the email containing the consolidated SMS messages received by message system 320 over the past hour from email node 342. In this manner, the user of communication device 302 is able to fully customize the manner in which SMS messages are processed and delivered by message system 320.

Figure 5:
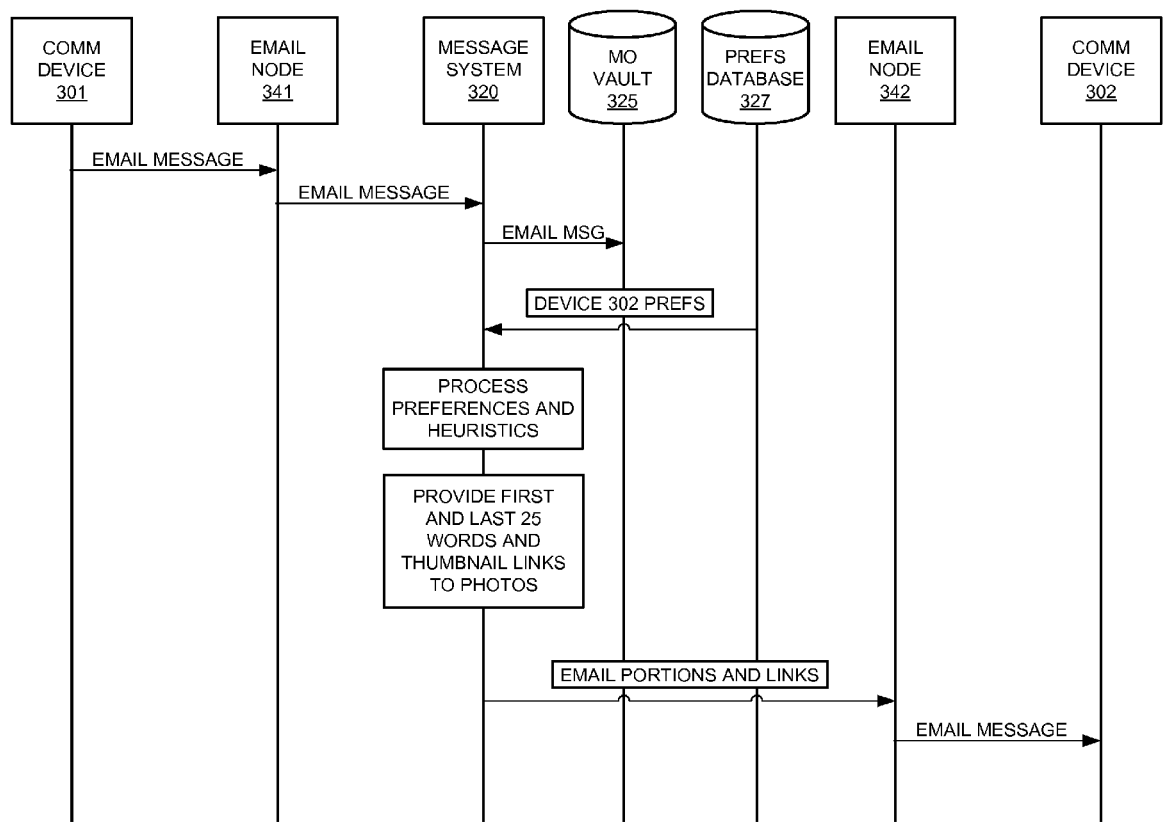
FIG. 5 is a sequence diagram that illustrates an operation of the communication system in an exemplary embodiment.

FIG. 5 is a sequence diagram that illustrates an operation of communication system 300 in an exemplary embodiment. The sequence diagram of FIG. 5 provides another example of how message system 320 could be configured to process message objects addressed to a user of communication device 302. In FIG. 5, a user of communication device 301 transfers an email message for delivery to a user of communication device 302. Email node 341 therefore receives the email message from communication device 301. Rather than transferring the email message directly to email node 342 for delivery to communication device 302 (which could still occur in the event of a failure in message system 320), email node 341 is configured to transfer the email message to message system 320 instead. For example, email node 341 could be configured to process the destination address of the email message to determine whether the user associated with the destination email address is subscribed to or other otherwise associated with message system 320.

Upon receipt of the email message from email node 341, message system 320 stores a copy of the email message in MO vault 325. In this example, the email message comprises several digital photographs and a block of text. Thus, the entire contents of the message including the images and the text are stored intact in the vault 325.

Message system 320 then retrieves preferences and heuristics associated with a user of communication device 302 from preferences database 327. To achieve this, message system 320 processes the email message to determine that the email is addressed to the user of communication device 302, and provides the user's email address or other user identifier to preferences database 327. Preferences database 327 then matches the user's email address with the preferences previously supplied by the user of device 302, and transfers these preferences to message system 320.

Message system 320 processes the user's preferences and heuristics to determine the user's decomposition instructions and delivery instructions for email messages. In this example, the user decomposition instructions direct message system 320 to generate a decomposed message object comprising the first and last 25 words of an email message along with thumbnail links to any photos included in the email. The thumbnails link to the full resolution photos attached to the original email as stored in the MO vault 325. The decomposed message object would also typically include a link to the full text of the original email. The user's delivery instructions direct message system 320 to provide the decomposed message object in an email format.

Message system 325 generates the decomposed message object per the above decomposition instructions and transfers the resulting email message to email node 342 for delivery to the user's email account. Then, utilizing communication device 302, the user receives the email comprising the first and last 25 words of the original message and the thumbnail images of the original photos linked to the copies of the photos in the vault 325. Advantageously, the user does not have to unnecessarily use network bandwidth to transfer the complete message to email node 342, but may still access all or part of the original message if the user chooses to do so. In this manner, the user is allowed full control over the presentation and delivery of the email message, and is therefore not limited to traditional delivery methods.

Figure 6:
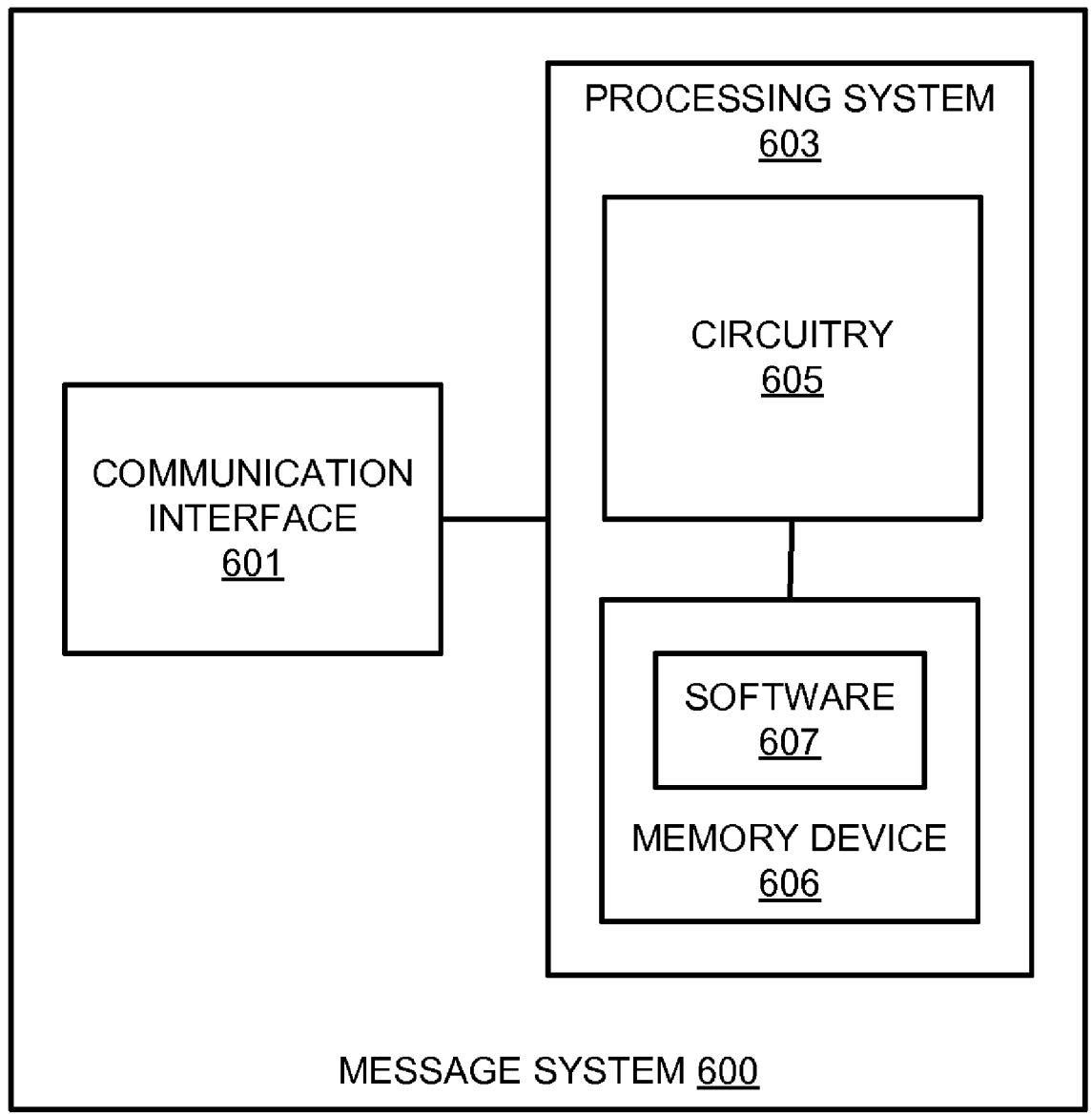
FIG. 6 is a block diagram that illustrates a message system.

FIG. 6 is a block diagram that illustrates message system 600. Message system 600 provides an example of message systems 120 and 320, although systems 120 and 320 may use alternative configurations. Message system 600 comprises communication interface 601 and processing system 603. Processing system 603 is linked to communication interface 601. Processing system 603 includes processing circuitry 605 and memory device 606 that stores operating software 607.

Communication interface 601 comprises components that communicate over communication links, such as network cards, ports, RF transceivers, processing circuitry and software, or some other communication components. Communication interface 601 may be configured to communicate over metallic, wireless, or optical links. Communication interface 601 may be configured to use TDM, IP, Ethernet, optical networking, wireless protocols, communication signaling, or some other communication format—including combinations thereof. Communication interface 601 is configured to receive a message object addressed to a user and transfer a decomposed message object for delivery to the user according to a delivery mechanism.

Processing circuitry 605 comprises microprocessor and other circuitry that retrieves and executes operating software 607 from memory device 606. Memory device 606 comprises a disk drive, flash drive, data storage circuitry, or some other memory apparatus. Operating software 607 comprises computer programs, firmware, or some other form of machine-readable processing instructions. Operating software 607 may include an operating system, utilities, drivers, network interfaces, applications, or some other type of software. When executed by circuitry 605, operating software 607 directs processing system 603 to operate message system 700 as described herein for message systems 120 and 320. In particular, operating software 607 directs processing system 603 to store a copy of a message object, process the message object based on user decomposition instructions to generate a decomposed message object, select a delivery mechanism for the decomposed message object based on user delivery instructions, and direct communication interface 601 to transfer the decomposed message object for delivery to a user according to the delivery mechanism.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A message system comprising:
a communication interface configured to receive a message object addressed to a user, wherein the message object comprises a plurality of short message service messages;
a processing system comprising circuitry configured to store a copy of the message object, process the message object based on user decomposition instructions to generate a decomposed message object, wherein the user decomposition instructions direct the processing system to generate the decomposed message object by consolidating the short message service messages into a single email message, select a delivery mechanism for the decomposed message object based on user delivery instructions, and direct the communication interface to transfer the decomposed message object for delivery to the user according to the delivery mechanism; and the communication interface configured to transfer the decomposed message object for delivery to the user according to the delivery mechanism.

2. The message system of claim 1 wherein the decomposed message object comprises a link to the copy of the message object.

3. The message system of claim 1 wherein the message object comprises video, and wherein the user decomposition instructions direct the processing system to generate the decomposed message object by generating thumbnail still shots of the video.

4. The message system of claim 1 wherein the message object comprises a voicemail message and wherein the user decomposition instructions direct the processing system to generate the decomposed message object by converting the voicemail message to a text format and generating an email message of the text format of the voicemail message.

5. The message system of claim 1 wherein the processing system configured to process the message object based on the user decomposition instructions to generate the decomposed message object comprises the processing system configured to generate the decomposed message object based on a content of the message object.

6. The message system of claim 1 wherein the processing system configured to process the message object based on the user decomposition instructions to generate the decomposed message object comprises the processing system configured to generate the decomposed message object based on device capabilities.

7. The message system of claim 1 wherein the processing system configured to process the message object based on the user decomposition instructions to generate the decomposed message object comprises the processing system configured to generate the decomposed message object based on network constraints.

8. The message system of claim 1 wherein the processing system configured to process the message object based on the user decomposition instructions to generate the decomposed message object comprises the processing system configured to generate the decomposed message object comprising a first portion of a beginning of the message object and a second portion of an end of the message object and not including a middle portion of the message object.

9. A method of operating a message system, the method comprising:

receiving a message object addressed to a user, wherein the message object comprises a plurality of short message service messages;

storing a copy of the message object;

processing the message object based on user decomposition instructions to generate a decomposed message object, wherein the user decomposition instructions direct the message system to generate the decomposed message object by consolidating the short message service messages into a single email message;

selecting a delivery mechanism for the decomposed message object based on user delivery instructions; and transferring the decomposed message object for delivery to the user according to the delivery mechanism.

10. The method of claim 9 wherein the decomposed message object comprises a link to the copy of the message object.

11. The method of claim 9 wherein the message object comprises video, and wherein the user decomposition instructions direct the message system to generate the decomposed message object by generating thumbnail still shots of the video.

12. The method of claim 9 wherein the message object comprises a voicemail message and wherein the user decomposition instructions direct the message system to generate the decomposed message object by converting the voicemail message to a text format and generating an email message of the text format of the voicemail message.

13. The method of claim 9 wherein processing the message object based on the user decomposition instructions to generate the decomposed message object comprises processing the message object to generate the decomposed message object based on a content of the message object.

14. The method of claim 9 wherein processing the message object based on the user decomposition instructions to generate the decomposed message object comprises processing the message object to generate the decomposed message object based on device capabilities.

15. The method of claim 9 wherein the processing system configured to process the message object based on the user decomposition instructions to generate the decomposed message object comprises the processing system configured to process the message object to generate the decomposed message object based on network constraints.

16. A computer apparatus comprising:

software instructions configured, when executed by a computer system, to direct the computer system to receive a message object addressed to a user, wherein the message object comprises a plurality of short message service messages, store a copy of the message object, process the message object based on user decomposition instructions to generate a decomposed message object, wherein the user decomposition instructions direct the processing system to generate the decomposed message object by consolidating the short message service messages into a single email message, select a delivery mechanism for the decomposed message object based on user delivery instructions, and transfer the decomposed message object for delivery to the user according to the delivery mechanism; and at least one non-transitory computer-readable storage medium storing the software instructions.

* * * * *